United States Patent
Chen et al.

(10) Patent No.: US 9,607,623 B2
(45) Date of Patent: Mar. 28, 2017

(54) METHOD AND APPARATUS FOR DETERMINING WATERMARK SYMBOLS IN A RECEIVED AUDIO SIGNAL THAT CAN CONTAIN ECHOES, REVERBERATION AND/OR NOISE

(71) Applicant: THOMSON LICENSING, Issy de Moulineaux (FR)

(72) Inventors: Xiaoming Chen, Hannover (DE); Peter Georg Baum, Hannover (DE); Michael Arnold, Isernhagen (DE); Ulrich Gries, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/781,960

(22) PCT Filed: Mar. 28, 2014

(86) PCT No.: PCT/EP2014/056304
§ 371 (c)(1),
(2) Date: Oct. 2, 2015

(87) PCT Pub. No.: WO2014/161785
PCT Pub. Date: Oct. 9, 2014

(65) Prior Publication Data
US 2016/0049154 A1 Feb. 18, 2016

(30) Foreign Application Priority Data

Apr. 2, 2013 (EP) .................................... 13305425

(51) Int. Cl.
*G06F 17/00* (2006.01)
*G10L 19/018* (2013.01)
*G11B 20/00* (2006.01)

(52) U.S. Cl.
CPC ...... *G10L 19/018* (2013.01); *G11B 20/00884* (2013.01); *G11B 20/00891* (2013.01); *G06F 2221/0733* (2013.01)

(58) Field of Classification Search
CPC ... G10L 19/018; H04N 1/32; G06F 2221/073; G06F 3/1243; G11B 20/00282;
(Continued)

(56) References Cited

U.S. PATENT DOCUMENTS

| 2009/0187765 | A1* | 7/2009 | Baum | ................ G06T 1/0078 713/176 |
| 2010/0166120 | A1* | 7/2010 | Baum | ............ G11B 20/00086 375/343 |
| 2011/0103444 | A1* | 5/2011 | Baum | ................ G10L 19/018 375/224 |

FOREIGN PATENT DOCUMENTS

| EP | WO2005078658 | 8/2005 |
| EP | 2081188 | 7/2009 |
| WO | WO2011141292 | 11/2011 |

OTHER PUBLICATIONS

Arnold et al., "Robust detection of audio watermarks after acoustic path transmission", Proceedings of the 12th ACM Workshop on Multimedia and Security, MM&SEC'10, Jan. 1, 2010, p. 117-126.
(Continued)

*Primary Examiner* — Andrew C Flanders
(74) *Attorney, Agent, or Firm* — Myers Wolin LLC

(57) ABSTRACT

Following transmission of a watermarked audio signal over an acoustic path causing echoes, reverberation and/or noise, watermark detection correlation result peak values are concentrated within a limited temporal range around main correlation result peaks, which limited temporal range is much smaller than the total correlation length. The watermark detection is based on the following: given $n_p$ correlation result peak values $v=(v_1, v_2, \ldots, v_{np})$ in an average or
(Continued)

expected probability distribution for correlation result values for unmarked content, the probability is calculated that within windows covering the limited temporal range there are $n_p$ or more values from a correlation result value set greater than or equal to these peaks v.

8 Claims, 4 Drawing Sheets

(58) Field of Classification Search
CPC ........ G11B 20/00884; G11B 20/00891; G11B 20/00898; G11B 20/00905; G11B 20/00913
See application file for complete search history.

(56) References Cited

OTHER PUBLICATIONS

Search Report Dated May 27, 2014.

\* cited by examiner

METHOD AND APPARATUS FOR DETERMINING WATERMARK SYMBOLS IN A RECEIVED AUDIO SIGNAL THAT CAN CONTAIN ECHOES, REVERBERATION AND/OR NOISE

This application claims the benefit, under 35 U.S.C. §365 of International Application PCT/EP2014/056304, filed Mar. 28, 2014, which was published in accordance with PCT Article 21(2) on Oct. 9, 2014 in English and which claims the benefit of European patent application No. 13305425.4, filed Apr. 2, 2015.

TECHNICAL FIELD

The invention relates to a method and to an apparatus for determining watermark symbols in a received audio signal that can contain echoes, reverberation and/or noise.

BACKGROUND

Audio watermarking is the process of embedding in an inaudible way additional information into an audio signal. The embedding is performed by changing the audio signal, for example by adding pseudo-random noise or echoes. To make the embedding in-audible, the strength of the embedding is controlled by a psycho-acoustic analysis of the audio signal. WO 2011/141292 A1 describes watermark detection in the presence of echoes, reverberation and/or noise in an audio signal, e.g. loudspeaker sound received by a microphone. These echoes are resulting in multiple peaks within a correlation result value sequence of length N with a watermark symbol (i.e. a reference signal), and are used for improving the watermark detection reliability. Basic steps of that statistical detector are:

Find peak values $v=(v_1, v_2, \ldots, v_{n_p})$ in the correlation result sequence for each candidate watermark symbol, where $v_1 \geq \ldots \geq v_{n_p}$ and $n_p$ is the number of correlation result peak values taken into consideration;

Recursively calculate the false positive probability $P_{(k)}$, $k=1, \ldots, n_p$, of the candidate watermark symbol being embedded;

Select the candidate watermark symbol resulting in the lowest $P_{(k)}$ value.

$P_{(k)}$ is the probability of falsely accepting the candidate watermark symbol. It describes the probability of k or more correlation result values from a non-watermarked signal section being greater than or equal to the actual k peak values under consideration.

That statistical detector solves the following problems:
a) How to recursively evaluate the probability $P_{(k)}$, where the number k of considered peak values can be increased gradually.
b) How to minimise the computational complexity by re-using already performed calculations.

That statistical detector uses several correlation result peaks in order to improve the detection performance. Especially this improvement is advantageous if the watermarked tracks are transmitted over an acoustic path resulting in multipath detection due to echoes. The $n_p$ peaks $v_1 \geq \ldots \geq v_{n_p}$ used for calculating $P_{(k)}$ are taken from the whole correlation result value sequence of length N.

SUMMARY OF INVENTION

However, this kind of processing does not reflect the physical reality in an optimum way because the additional peak values in the correlation result value sequence are stemming from reverberations and are therefore grouped closely around the main peak. I.e., they will be time delayed in relation to the direct path between the loudspeaker and the microphone of the detection device, but only within a limited time period. In case the watermark detection device receives sound over an acoustic path with a distance of $d_s$ (measured in samples s) from the source, the propagation distance is $d_m = d_s \, cT$ meters, where cT is the distance the sound is propagating within one sampling interval, $T=1/f$ is the sampling rate and c is the speed of sound.

For example, if $d_m^d = 4$ m for the direct path and $d_m^i = 2 d_m^d = 8$ m for an indirect path, the distance in samples between the main peak of the direct path and that neighbour peak due to the reflection is $\Delta d_s = d_s^i - d_s^d = d_m^d / cT \approx 560$ samples with $c \approx 343$ m/s and $f \approx 48000$ samples/s. In a typical setting the correlation length is $N=16$ k samples (with 1 k$\equiv$1024). Therefore the peaks are to be searched in a window of e.g. size $L \approx 1$ k samples (i.e. $L \ll N$) around the main peak value or peak values, and the corresponding false positive probabilities are to be calculated. Since the main correlation result peak value is located somewhere in the current set of N correlation result values, the false positive probability is calculated for all possible N−L+1 shifts of the window of size L within a buffer of size N.

A problem to be solved by the invention is to take the physics of multipath reception better into account than in known statistical watermark detectors, and thus to improve false positive probability calculation and watermark detection performance. This problem is solved by the method disclosed in claim 1. An apparatus that utilises this method is disclosed in claim 2.

As mentioned above, following transmission of a watermarked audio signal over an acoustic path causing echoes, reverberation and/or noise, watermark detection correlation result peak values generally are concentrated around main correlation result peaks within a limited temporal range, with its maximum size denoted as L, which is much smaller than the total correlation length N. The related task for watermark detection can be formulated as follows:

Given $n_p$ peak values $v=(v_1, v_2, \ldots, v_{n_p})$ in an average or expected probability distribution for correlation result values for unmarked audio signal content, how to calculate the probability $P_{FP}(n_p, L, v)$ that within a sliding window of length L there are $n_p$ or more peak values from a current length N correlation result value set greater than or equal to these peaks v?

Measurements have shown that such average or expected probability distribution for correlation result values for unmarked content corresponds to, or is similar to, a Gaussian distribution.

Remark: when performing a correlation by shifting sample-by-sample a reference pattern over a current input audio signal section, the N-values result of this correlation can have positive peak values as well as negative peak values, which together are denoted 'peak amount values'.

To simplify the following description, some notations are introduced:

$c_j \triangleq (c_j, c_{j+1}, \ldots, c_{j+L+1})$ denotes L correlation result values within the j-th sliding window of length L starting at position j within N.

$c_j \geq v$ indicates that in vector $c_j$ there are $n_p$ or more current correlation result values greater than or equal to the $n_p$ peak values v in the average or expected probability distribution for correlation result values for unmarked content.

$c_j \not\geq v$ means that less than $n_p$ current correlation result values in vector $c_j$ are greater than or equal to the $n_p$ peak values $v$ in the average or expected probability distribution for correlation result values for unmarked content.

Remark: $c_j \not\geq v$ is complementary to $c_j \geq v$ in that $\Pr\{c_j \not\geq v\} + \Pr\{c_j \geq v\} = 1$, where Pr means probability.

Let a sliding window of length L shift through N correlation result values. As mentioned above, the required FP (false positive) probability is the probability that for one or more times the sliding window contains $n_p$ or more correlation result amount values greater than or equal to the $n_p$ peak values in the average or expected probability distribution for correlation result values for non-watermarked audio signal content. The complementary case for that FP probability is that there is no sliding window containing $n_p$ or more correlation result amount values greater than or equal to $n_p$ peak values in the average or expected probability distribution for correlation result values for non-watermarked audio signal content, namely $c_j \not\geq v, \forall j$. Consequently, $\Pr\{c_j \not\geq v, \forall j\}$ is the complementary probability for the false positive probability $\Pr\{\exists j \in (1, \ldots, N-L+1), c_j \geq v\}$ (one or more windows indexed by j).

The final FP probability calculation can be expressed as (see the detailed description further below):

$$1 - \Pr\{c_j \not\geq v, \forall j\} = 1 - \Pr\{c_2 \not\geq v \mid c_1 \not\geq v\}^{N-L} \Pr\{c_1 \not\geq v\}$$

$$= 1 - \left(1 - \frac{\Pr\{c_2 \geq v, c_1 \not\geq v\}}{\Pr\{c_1 \not\geq v\}}\right)^{N-L} \Pr\{c_1 \not\geq v\}.$$

For L=N (in that case $c_1 \equiv c = (c_1, c_2, \ldots, c_N)$), in view of the above Remark in the '$c_j \not\geq v$' definition, this general formula reduces to the case of the recursive calculation in the WO 2011/141292 statistical detector: $\Pr\{c_1 \geq v\} = 1 - \Pr\{c_1 \not\geq v\}$.

The calculation of $\Pr\{c_1 \not\geq v\}$ is described for the statistical detector in WO 2011/141292: based on peak values in the correlation result values for a current signal section, it is detected which one of the candidate symbols is present in the current signal section by using related values of false positive probability of detection of the kind of watermark symbol, wherein the false positive probability is calculated in a recursive manner and the total false positive probability for a given number of correlation result peak values is evaluated by using initially the false positive probabilities for a smaller number of correlation result peak values, and by increasing gradually the number of considered correlation result peak values according to the required detection reliability.

Therefore the calculation of the false positive probability in the following description is mapped to the problem of calculating $\Pr\{c_2 \geq v, c_1 \not\geq v\}$: for a given number $n_p$ of peak values this probability can be recursively calculated from the probabilities for $n_p - 1$ peak values starting with peaks i=1,2 (cf. section Description of embodiments).

While the invention improves the detection performance of the WO 2011/141292 statistical watermark detection processing by significantly reducing false positive detection decisions, it retains all advantages of the WO 2011/141292 watermark detection.

Advantageously, the invention can be used in a 2nd screen scenario where a user watches TV and gets via the watermarked TV sound watermark information e.g. for a tablet computer that uses the watermark information for downloading and presenting basically in synchronism additional information related to the current TV program.

In principle, the inventive method is suited for determining watermark symbols in a received audio signal that can contain echoes, reverberation and/or noise, said method including the steps:

correlating a current section of the received audio signal with at least two different candidate reference pattern signals related to corresponding different candidate watermark symbols is, so as to produce in each case N current correlation result values $c_{is}$ for each candidate watermark symbol is;

for each candidate watermark symbol is, determining M peak values within said correlation result values $c_{is}$;

derived from said M correlation result peak values for each candidate watermark symbol is, either determining for said current section of said received audio signal a watermark symbol out of said candidate watermark symbols is, or determining that no watermark symbol has been detected, wherein said watermark symbol determination includes the further steps:

for each one of said M peak values denoted global peak values and for each candidate watermark symbol is, determining from the current correlation result values $c_{is}$ a corresponding vector $v_{is}^k$ of $n_p$ peak values within each one of M windows of length L, each length-L window including one of said M global peak values and the summed-up length of all length-L windows being smaller than N, wherein k=1, ..., M;

for each one of said M windows of length L, calculating from the current correlation result values $c_{is}$ a false positive probability $FP(v_{is}^k)$ value which corresponds to the probability that for one or more times such length-L window contains $n_p$ or more correlation result values greater than or equal to $n_p$ peak values in an average or expected probability distribution for correlation result values for a non-watermarked audio signal;

selecting for the current section of said received audio signal that candidate watermark symbol is as a detected watermark symbol which has the minimum false positive probability value $\min_{is}(\min_k(FP(v_{is}^k)))$.

In principle the inventive apparatus is suited for determining watermark symbols in a received audio signal that can contain echoes, reverberation and/or noise, said apparatus including:

means being adapted for correlating a current section of the received audio signal with at least two different candidate reference pattern signals related to corresponding different candidate watermark symbols is, so as to produce in each case N current correlation result values $c_{is}$ for each candidate watermark symbol is;

means being adapted for determining, for each candidate watermark symbol is, M peak values within said correlation result values $c_{is}$, and for determining, derived from said M correlation result peak values for each candidate watermark symbol is, for said current section of said received audio signal a watermark symbol out of said candidate watermark symbols is, or for determining that no watermark symbol has been detected, wherein, for each one of said M peak values denoted global peak values and for each candidate watermark symbol is, there is determined from the current correlation result values $c_{is}$ a corresponding vector $v_{is}^k$ of $n_p$ peak values within each one of M windows of length L, each length-L window including one of said M global peak values and the summed-up length of all length-L windows being smaller than N, wherein k=1, ..., M, and wherein, for each one of said M windows of length L, from the current correlation result values $c_{is}$ a false positive probability $FP(v_{is}^k)$ value is calculated which corresponds to the probability that for one or more times such length-L window contains $n_p$ or more correlation result values greater than or equal to $n_p$ peak values in an average or expected probability distribution for correlation result values for a non-watermarked audio signal,
and wherein for the current section of said received audio signal that candidate watermark symbol is is selected as a detected watermark symbol which has the minimum false positive probability value $\min_{is}(\min_k(FP(v_{is}^k)))$.

Advantageous additional embodiments of the invention are disclosed in the respective dependent claims.

BRIEF DESCRIPTION OF DRAWINGS

Exemplary embodiments of the invention are described with reference to the accompanying drawings, which show in.

DESCRIPTION OF EMBODIMENTS

Figure 1:
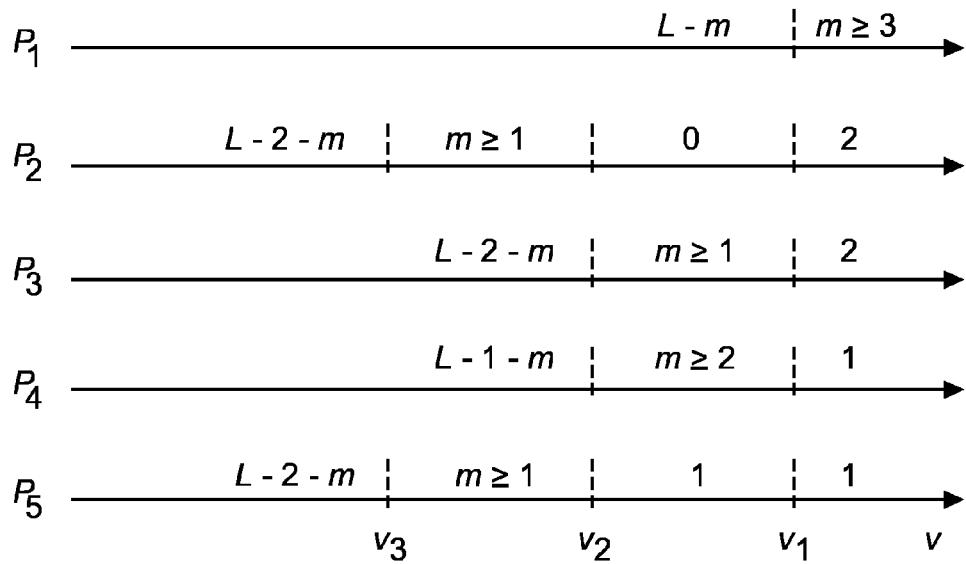
FIG. 1 Disjoint possibilities of three or more correlation values being greater than or equal to three correlation result peak values $v_3$, $v_2$, $v_1$.

A. Definition of False Positive (FP) Probability

It is well-known in watermark detection based on cross-correlation to use a single correlation result peak value for determining the embedded watermark information. In this invention, however, optimum watermark detection employing multiple correlation result peak amount values is described. For evaluating FP probability it is assumed that:
  correlation values between any unmarked signal section content and a reference pattern or watermark symbol are independent identically distributed random variables;
  for a specific correlation result peak value v, it is known how to calculate the corresponding probability distribution tail probability $p' \triangleq \Pr\{c \geq v\}$, where c denotes a correlation value subject to a specific distribution like Gaussian.

For a single peak value v in a current correlation result of length N, the FP probability is the probability that in the average or expected probability distribution for correlation result values for unmarked content there are one or more values out of N correlation values not less than that peak value v. Similarly, for $n_p$ peak values $v_1 \geq v_2 \geq \ldots \geq v_{n_p}$, the false positive probability is defined as the probability that in the average or expected probability distribution for correlation result values for unmarked content there are $n_p$ or more correlation result values greater than or equal to these peaks $v_1, v_2, \ldots v_{n_p}$, where corresponding tail probabilities are defined as $p_i \triangleq \Pr\{c \geq v_i\}, 1 \leq i \leq n_p$.

Given a specific correlation result vector sample $c_1^L \triangleq [c_1, \ldots, c_L]$ following sorting ($x_{n_1}^{n_2}$ denotes a vector collecting sequence values x indexed from $n_1$ to $n_2$), i.e. $c_1 \geq c_2 \geq \ldots \geq c_L$, it can be determined whether it has $n_p$ or more values greater than or equal to $v_1^{n_p}$ :
  nGT = 0;
  for i = 1:np
    if ci >= vi
      nGT = nGT + 1;
    end
  end If nGT=np, $c_1^L$ has $n_p$ or more values greater than or equal to $v_1^{n_p}$, which is denoted as $c_1^L \geq v_1^{n_p}$ in the sequel. Cases for $C_1^L \geq v_1^{n_p}$ are divided into disjoint events. The final FP probability is the sum of probabilities for individually occurring events.

A.1 Correlation Value Distribution, Comparison to Multiple Peaks

For the purpose of comparing correlation result values to multiple peak values, the complete range of correlation result amount values is divided into $n_p+1$ intervals:

$$[-\infty, v_{n_p}), [v_{n_p}, v_{n_p-1}), [v_{n_p-1}, v_{n_p-2}), \ldots, [v_1, +\infty).$$

Correlation value distribution is then performed by counting how many correlation result amount values are located within individual intervals, which can be described by a representative vector. Because sometimes a number of values in some intervals are irrelevant for FP probability evaluation, representative vectors may have different lengths. Therefore, in this description, the most right element of a representative vector always corresponds to the interval $[v_1, +\infty)$, while it's most left element is referred to as its first element.

FIG. 1 illustrates correlation value distributions for different cases where $n_p=3$ or more correlation result values are greater than or equal to three peak values $v_3 \leq v_2 \leq v_1$. Case $P_1$ can be described by a representative vector [m≥3], indicating that there are 3 or more correlation result values in the interval $[v_1, \infty)$ and that the other L−m correlation result values are less than peak value $v_1$. On one hand, regardless of how many values there are in intervals $[v_3, v_2)$ or $[v_2, v_1)$, these cases are all included in the condition that there are L−m correlation result values less than $v_1$. On the other hand, for comparison with three peaks, it is convenient to check how many correlation result values are located within the specific intervals $[v_3, v_2), [v_2, v_1), [v_1, \infty)$. For a representative vector [m≥3] the worst case is that there is neither a correlation result value within interval $[v_3, v_2)$ nor within interval $[v_2, v_1)$, corresponding to a representative vector [0,0,m≥3].

For such case, due to $v_1 \geq v_2, v_1 \geq v_3$, there is still at least one value $\geq v_1$, one value $\geq v_2$, and one value $\geq v_3$. This can be interpreted as two zeros associated with the intervals $[v_3, v_2)$ and $[v_2, v_1)$ are compensated by m≥3 in the interval $[v_1, \infty)$. For simplicity, a 'zero compensated representative vector' denoted [[ . . . ]] can be defined in this case as [[1,1,m≥1]], derived from the original representative vector [m≥3]. If not otherwise stated, a zero compensated representative vector having a length $n_p$ is used for the interval $[v_{n_p}, +\infty)$.

E.g. in case $P_2$, there are two correlation result values in the interval $[v_1, \infty)$, zero correlation result values in the interval $[v_2, v_1)$, m≥1 correlation result values in the interval $[v_3, v_2)$, and L−2−m correlation result values are less than $v_3$.

Given a representative vector $a=[a_n, \ldots, a_2, a_1]$, its corresponding zero compensated counterpart is derived as follows:

Expand vector a to length $n_p$ by adding $n_p-n$ zeros: a'=$[0_{n_p-n}, a]$;

Find elements greater than '1' in a' as $\{a_j^{(t)}, 1 \le t \le T\}$;

For t=1, 2, ..., T, perform zero compensation: If there are zeros on the left hand side of $a_j^{(t)}$, at most $a_j^{(t)}-1$ zeros can be compensated from right to the left. During zero compensation, zero elements and corresponding $a_j^{(t)}$ are successively updated. Each time a '0' is compensated, its value in a' is changed to '1', and $a_j^{(t)}$ in a' is reduced by one.

The resulting vector a' is the zero compensated representative vector for a. Note that zero compensated representative vectors for any interval $[v_k, +\infty)$ with $k \ge n$ can be similarly obtained by just replacing $n_p$ with k.

For example, representative vectors and their zero compensated representative vectors for the cases listed in FIG. 1 are [m≥3],[m≥1,0,2],[m≥1,2],[m≥2,1],[m≥1,1,1] and [[1,1,m≥1]],[[m≥1,1,1]],[[1,m≥1,1]],[[1,m≥1,1]],[[m≥1,1,1]], respectively. Obviously, the mapping from a representative vector to a corresponding zero compensated representative vector is unique, while this is possibly not true for the reverse mapping.

Advantageously, with the introduction of such zero compensated representative vectors it becomes much easier to compare correlation result values including multiple peaks. Specifically, if there is no zero element in the zero compensated representative vector, it can be assumed that a correlation vector collecting N correlation values, denoted as $c_1^N=(c_1, c_2, \ldots, c_N)$, is greater than or equal to $n_p$ peaks, which is concisely denoted as $c_1^N \ge v_1^{n_p}$. Moreover, if there are k zeros in the zero compensated representative vector, it can be stated that $c_1^N$ has exactly $n_p-k$ values $\ge v_1^{n_p}$. According to the value distribution shown in FIG. 1, the probabilities for individual events are calculated as $$P_1 = \sum_{m=3}^{L} \binom{L}{m} p_1^m (1-p_1)^{L-m}$$

$$P_2 = \binom{L}{2} p_1^2 \sum_{m=1}^{L-2} \binom{L-2}{m} (p_3-p_2)^m (1-p_3)^{L-2-m}$$

$$P_3 = \binom{L}{2} p_1^2 \sum_{m=1}^{L-2} \binom{L-2}{m} (p_2-p_1)^m (1-p_2)^{L-2-m}$$

$$P_4 = \binom{L}{1} p_1 \sum_{m=2}^{L-1} \binom{L-1}{m} (p_2-p_1)^m (1-p_2)^{L-1-m}$$

$$P_5 = \binom{L}{1} p_1 \binom{L-1}{1} (p_2-p_1) \sum_{m=1}^{L-2} \binom{L-2}{m} (p_3-p_2)^m (1-p_3)^{L-2-m},$$

and the final FP probability is $P_{FP}=P_1+P_2+P_3+P_4+P_5$. The factor $(p_i-p_{i-1})$ is the probability of obtaining a correlation result peak with a value in the range $[v_i, v_{i-1}]$, whereas $(1-p_i)$ is the probability of getting a peak in the range $(-\infty, v_i]$.

B. FP Probability for Correlation Result Peak Values Within a Limited Range

As mentioned above, for signal transmission over an acoustic path correlation result peak amount values generally are concentrated within a limited temporal range of maximum size L, which is much smaller than the correlation length N.

Thus, for $n_p$ peak amount values within a current window of length L out of N correlation result values, the probability is to be computed that in the average or expected probability distribution for correlation result values for unmarked content there are $n_p$ or more correlation result amount values greater than or equal to the $n_p$ peak amount values in this current length L window.

B.1 Inventive FP Probability Calculation Processing

The definitions for $c_j \triangleq (c_j, c_{j+1}, \ldots, c_{j+L-1})$, $c_j \ge v$ and $c_i \not\ge v$ were given above.

The complementary case for the sliding window containing for one or more times $n_p$ or more values greater than or equal to $n_p$ expected peaks is that there is no sliding window that contains $n_p$ or more values greater than or equal to $n_p$ expected peaks, namely, $c_j \not\ge v, \forall j$. Consequently, the complementary probability for the FP probability is $$\Pr\{c_j \not\ge v, \forall j\} = \Pr\{c_1 \not\ge v, c_2 \not\ge v, \ldots, c_{N-L+1} \not\ge v\}. \quad (1)$$

Using the chain rule, the joint probability $\Pr\{c_1 \not\ge v, c_2 \not\ge v, \ldots, c_{N-L+1} \not\ge v\}$ can be calculated by means of conditional probabilities:

$$\begin{aligned}
\Pr\{c_1 \not\ge v, \ldots, c_{N-L+1} \not\ge v\} &= \Pr\{c_{N-L+1} \not\ge v \mid c_{N-L} \not\ge v, \ldots, c_1 \not\ge v\} \cdot \\
&\quad \Pr\{c_{N-L} \not\ge v, c_{N-L-1} \not\ge v, \ldots, c_1 \not\ge v\} \\
&= \Pr\{c_{N-L+1} \not\ge v \mid c_{N-L} \not\ge v, \ldots, c_1 \not\ge v\} \\
&\quad \Pr\{c_{N-L} \not\ge v \mid c_{N-L-1} \not\ge v, \ldots, c_1 \not\ge v\} \ldots \\
&\quad \Pr\{c_2 \not\ge v \mid c_1 \not\ge v\} \cdot \Pr\{c_1 \not\ge v\}.
\end{aligned} \quad (2)$$

For a correlation vector $c_j$ only the last predecessor $c_{j-1}$ is relevant in the conditional probability $\Pr\{c_j \not\ge v \mid c_{j-1} \not\ge v, \ldots, c_1 \not\ge v\}$, since it contains all but one new element of $c_j$:

$$\Pr\{c_j \not\ge v \mid c_{j-1} \not\ge v, \ldots, c_1 \not\ge v\} = \Pr\{c_j \not\ge v \mid c_{j-1} \not\ge v\}.$$

Therefore, the joint probability $\Pr\{c_1 \not\ge v, c_2 \not\ge v, \ldots, c_{N-L+1} \not\ge v\}$ can be written as $$\Pr\{c_1 \not\ge v, \ldots, c_{N-L+1} \not\ge v\} = (\Pi_{j=2}^{N-L+1} \Pr\{c_j \not\ge v \mid c_{j-1} \not\ge v\}) \cdot \Pr\{c_1 \not\ge v\}.$$

In addition, a subset of L correlation samples already represents a representative set of all the N samples because L is large enough, leading to the identity $$\Pr\{c_j \not\ge v \mid c_{j-1} \not\ge v\} = \Pr\{c_2 \not\ge v \mid c_1 \not\ge v\},$$

which is employed in equation (2):

$$\Pr\{c_1 \not\ge v, \ldots, c_{N-L+1} \not\ge v\} = (\Pr\{c_2 \not\ge v \mid c_1 \not\ge v\})^{N-L} \cdot \Pr\{c_1 \not\ge v\}. \quad (3)$$

Since it is known how to evaluate $\Pr\{c_1 \not\ge\}$, the FP probability calculation reduces to evaluation of the conditional probability $\Pr\{c_2 \not\ge v \mid c_1 \not\ge v\}$.

B.2 Conditional Probability Evaluation

The conditional probability $\Pr\{c_2 \not\ge v \mid c_1 \not\ge v\}$ can be reformulated using the definition of the conditional probability. Given two events A and B with P(B)>0, the conditional probability of A given B is defined as $$P(A \mid B) \triangleq \frac{P(A \cap B)}{P(B)}. \quad (4)$$

Therefore $\Pr\{c_2 \not\geq v | c_1 \not\geq v\}$ can be written as:

$$\Pr\{c_2 \not\geq v | c_1 \not\geq v\} = 1 - \Pr\{c_2 \geq v | c_1 \not\geq v\} = 1 - \frac{\Pr\{c_2 \geq v, c_1 \not\geq v\}}{\Pr\{c_1 \not\geq v\}}. \quad (5)$$

Consequently, the FP probability can be evaluated as $$1 - \Pr\{c_j \not\geq v, \forall j\} = 1 - \Pr\{c_2 \not\geq v | c_1 \not\geq v\}^{N-L} \Pr\{c_1 \not\geq v\} \quad (6)$$

$$= 1 - \left(1 - \frac{\Pr\{c_2 \geq v, c_1 \not\geq v\}}{\Pr\{c_1 \not\geq v\}}\right)^{N-L} \cdot \Pr\{c_1 \not\geq v\}.$$

This general formula reduces for L=N to the case of recursive calculation in the WO 2011/141292 statistical watermark detection processing (in that case $c_1 \triangleq [c_1, \ldots, c_N]$):

$$\Pr\{c_1 \geq v\} = 1 - \Pr\{c_1 \not\geq v\}.$$

For calculating equation (6) in case L≠N, a split-up is carried out as explained in the following section.

B.3 Joint Probability Evaluation Based on Correlation Value Distributions

The joint probability $\Pr\{c_2 \geq v, c_1 \not\geq v\}$ can be represented as $\Pr\{c_2 \geq v, c_1 \not\geq v\} = \Pr\{c_2^L$ has exactly $(n_p - 1)$ values $\geq v$, adding $c_{L+1}$ to $c_2^L$ makes $c_2 \geq v$, adding $c_1$ to $c_2^L$ makes $c_1 \not\geq v\}$. $\quad (7)$ Cases where $c_2^L$ has exactly $(n_p-1)$ values $\geq v$ are divided into two disjoint groups again:

- $c_2^L$ has exactly $(n_p-1)$ values $\geq v_1^{n_p-1}$ in the interval $[v_{n_p}^{-1}, +\infty)$ and has no value in the interval $[v_{n_p}, v_{n_p-1})$. For this case, the corresponding zero compensated representative vector for the interval $[v_{n_p}^{-1}, +\infty)$ will have no zero element and simultaneously only '1' elements. Otherwise, the zero in the interval $[v_{n_p}, v_{n_p-1})$ will be compensated, which contradicts the constraint that $c_2^L$ has exactly $(n_p-1)$ values $\geq v$.
- $c_2^L$ has exactly $(n_p-2)$ values $\geq v_1^{n_p-1}$ in the interval $[v_{n_p-1}, +\infty)$, and exactly $(n_p-1)$ values $\geq v$ in the interval $[v_{n_p}, +\infty)$, which corresponds to cases with 'm≥b' in some interval for value distribution. This is apparent from the following example.

In the case of $n_p=3$, $c_2^L$ has exactly $n_p-2=1$ value $\geq v_1^{n_p-1}$ in the interval $[v_2, +\infty)$. This means that all zero compensated representative vectors for the interval $[v_2, +\infty)$ have one zero element. More specifically, [[0,1]] and [[m≥1,0]] are corresponding zero compensated representative vectors for $n_p=3$.

For [[0,1]], in order that $c_2^L$ has exactly $(n_p-1)=2$ values $\geq v$ in the interval $[v_3, +\infty)$, there must be one or more values in the interval $[v_3, v_2)$. Consequently, the zero compensated representative vector for the interval $[v_3, +\infty)$ becomes [[m≥1,0,1]], meaning that there are m≥1 values in the interval $[v_3, v_2)$.

For [[m≥1,0]], it can be further distinguished into [[1,0]] or [[m≥2,0]]. For [[1,0]], the zero compensated representative vector must be [[m≥1,1,0]], so that $c_2^L$ has exactly $(n_p-1)=2$ values $\geq v$ in the interval $[v_3, +\infty)$. For [[m≥2,0]], the corresponding representative vector is [m≥2,0], while no further requirements on the number of values in the interval $[v_3, v_2)$ are necessary to meet the condition that $c_2^L$ has exactly $(n_p-1)=2$ values $\geq v$.

Figure 2:
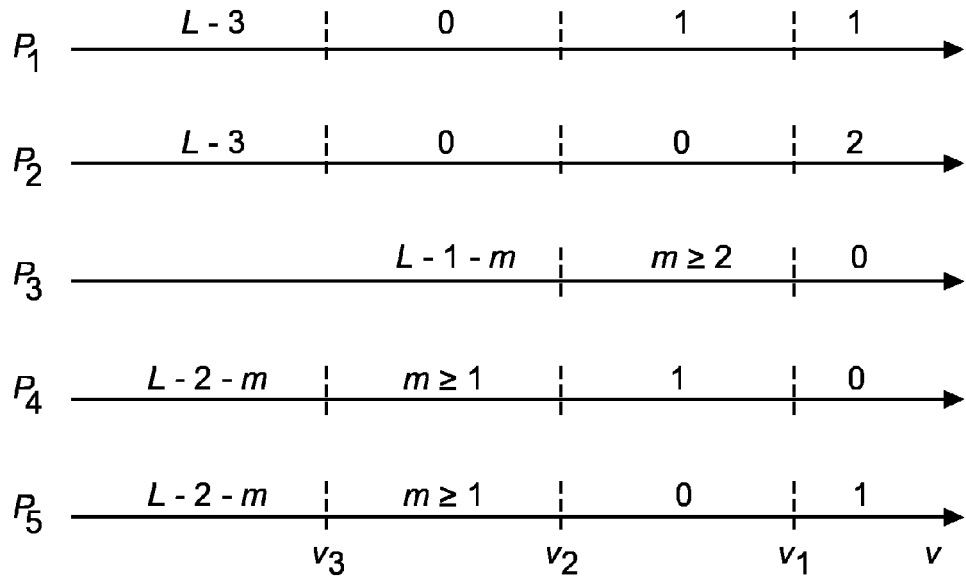
FIG. 2 Disjoint possibilities of $c_2^L$ having two values $\geq v$, with corresponding representative vectors [0,1,1],[0,0,2], [m≥2,0],[m≥1,1,0],[m≥1,0,1] and zero compensated representative vectors [[0,1,1]],[[0,1,1]], [[1, m≥1,0]],[[m≥1,0], [[m≥1,0,1]]

FIG. 2 lists cases where $c_2^L$ has exactly two values $\geq v$. $P_1$ and $P_2$ correspond to cases where $c_2^L$ has no value in the interval $[v_3, v_2]$. Cases $P_3$, $P_4$, and $P_5$ have 'm≥b' in one interval. For the five cases of FIG. 2 all zero compensated representative vectors have a single zero element only.

Therefore it is straightforward to choose the value range for $c_{L+1}$ and $c_1$ such that adding $c_{L+1}$ to $c_2^L$ makes $c_2 \geq v$, and adding $C_1$ to $c_2^L$ makes $c_1 \not\geq v$.

For example, $P_2$ corresponds to a zero compensated representative vector [[0,1,1]]. If $c_1 < v_3$, adding $c_1$ to $c_2^L$ will result in $c_1^L \not\geq v_1^3$. On the other side, if $c_{L+1} \geq v_3$, adding $c_{L+1}$ to $c_2^L$ will result in $c_2^L \geq v_1^3$.

Accordingly, the individual probabilities are calculated as $$P_1(\binom{L-1}{1}p_1(\binom{L-2}{1}(p_2-p_1)(1-p_3)^{L-3}p_3(1-p_3)$$

$$P_2(\binom{L-1}{2}p_1^2(1-p_3)^{L-3}p_3(1-p_3)$$

$$P_3(\Sigma_{m=2}^{L-1}\binom{L-1}{m}(p_2-p_1)^m(1-p_2)^{L-1-m}p_1(1-p_1)$$

$$P_4(\binom{L-1}{1}(p_2-p_1)\Sigma_{m=1}^{L-2}\binom{L-2}{m}p_3-p_2^m(1-p_3)^{L-2-m}p_1(1-p_1)$$

$$P_5(\binom{L-1}{1}p_1\Sigma_{m=1}^{L-2}\binom{L-2}{m}(p_3-p_2)^m(1-p_3)^{L-2-m}p_2(1-p_2)$$

In general, calculating the sum terms for the $P_3$, $P_4$, $P_5$ probabilities can be reformulated by employing the binomial theorem:

$$\sum_{m=n_1}^{n_2}\binom{n_2}{m}(p_{i+1}-p_i)^m(1-p_{i+1})^{n_2-m} =$$

$$\sum_{m=0}^{n_2}\binom{n_2}{m}(p_{i+1}-p_i)^m(1-p_{i+1})^{n_2-m} -$$

$$\sum_{m=0}^{n_1-1}\binom{n_2}{m}(p_{i+1}-p_i)^m(1-p_{i+1})^{n_2-m} =$$

$$(p_{i+1}-p_i+1-p_{i+1})^{n_2} - \sum_{m=0}^{n_1-1}\binom{n_2}{m}(p_{i+1}-p_i)^m(1-p_{i+1})^{n_2-m} =$$

$$(1-p_i)^{n_2} - \sum_{m=0}^{n_1-1}\binom{n_2}{m}(p_{i+1}-p_i)^m(1-p_{i+1})^{n_2-m},$$

which significantly reduces the computational complexity if $n_1 \ll n_2 - n_1$.

In addition, for 'm≥b' cases such as $P_3$, $P_4$, $P_5$ shown in FIG. 2, a look-up table for sums can be constructed in order to reduce the computation complexity.

Figure 3:
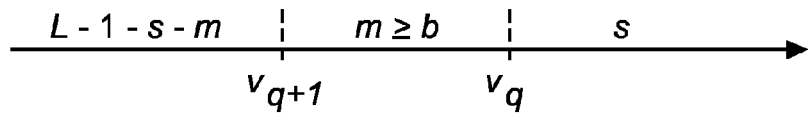
FIG. 3 General value distribution for 'm≥' cases.

FIG. 3 shows the general value distribution for 'm≥b' cases. The number of values in the interval $[v_q, \infty)$ is denoted by s, and in the interval $[v_{q+1}, v_q)$ there are m values. Accordingly, $1 \leq q \leq n_p - 1$ and $0 \leq s \leq n_p - 2$, and $b = n_p - 1 - s$. Given the number of peaks $n_p$, a look-up table dependent on q and s can be constructed as follows:

$$P_b[q][s] \triangleq \sum_{m=b=n_p-1-s}^{L-1-s}\binom{L-1-s}{m}(p_{q+1}-p_q)^m(1-p_{q+1})^{L-1-s-m}$$

$$= (1-p_q)^{L-1-s} - \sum_{m=0}^{n_p-2-s}\binom{L-1-s}{m}(p_{q+1}-p_q)^m(1-p_{q+1})^{L-1-s-m}.$$

Having representative vectors for all disjoint cases where $c_2^L$ has exactly $(n_p-1)$ values $\geq v$, it is straightforward to evaluate the FP probability.

B.4 Recursive Representative Vector Construction

The representative and zero compensated vectors are used for computing the false positive probability $FP(v_{is}^k)$. If these vectors are known, equations for the probabilities $P_1$ to $P_5$ can be formulated, see the examples in the description for FIG. 2. Thus, the calculation of $FP(v_{is}^k)$ is mapped to the problem of constructing all vectors for a given number $n_p$ of peaks.

In the following it is explained how to recursively obtain these representative vectors. As discussed previously, all cases in FIG. 2 can be represented by corresponding representative vectors: [0,1,1], [0,0,2], [m≥2,0], [m≥1,1,0], [m≥1,0,1]. The first two vectors can be determined recursively, see above. Regarding recursively constructing the last three vectors, two properties for last three vectors are:

the 'm≥b' element is always the first element;
the sum of all elements becomes m≥2.

In other words, given the remaining elements in a representative vector excluding the 'm≥b' element, the 'm≥b' element can be deduced: refer to FIG. 3 where, given s, $b=n_p-1-s$. Therefore, the representative vectors for the $P_3$, $P_4$, $P_5$ cases in FIG. 2 reduce to [0], [1,0], [0,1]. And the problem is changed to how to find these simplified representative vectors for $n_p$ peaks.

Motivated by FIG. 3, these representative vectors are divided into different sets according to $s \in \{0, 1, \ldots, n_p-2\}$ values. Given representative vectors for s, the corresponding representative vectors for s+1 can be constructed by expanding and adding unit vectors.

B.4.1 Initialization

For s=0, the set of representative vectors is {[0]}, for s=1, the set of representative vectors is {[0,1], [1,0]}.

B.4.2 Update for $1 \leq s \leq n_p-3$

Dependent on the length lj of individual representative vectors in the set for s, the representative vectors of the current recursion for s+1 are constructed differently:

If the length lj<s+1, find the first non-zero element in the representative vector. Let i be the position of the first non-zero element. Add unit vectors $e_1, \ldots, e_i$ to the representative vector to get new representative vectors. An example unit vector is $e_i=(0, \ldots, 0, 1, 0, \ldots, 0)$, where the first zero has position '1', the second zero has position 'i−1', the '1' has position 'i', the third zero has position 'i+1', and the last zero has position 'lj'.

If the length lj=s+1, expand a representative vector by adding one zero at the beginning. Find the first non-zero element in the expanded representative vector and add unit vectors.

However, if the '0' element in the zero compensated representative vector for a representative vector is on the right hand side of the first non-zero element in the representative vector, perform the finding and adding procedure for this representative vector without expanding.

B.4.3 Example 1

Update for s=1: two representative vectors [1,0] and [0,1] both having the length lj=s+1=2. For vector [0,1], there is no zero element after the first non-zero element. Therefore the new representative vectors are obtained as [0,0,2],[0,1,1], [1,0,1]. On the other hand, for vector [1,0] there is one zero element after its first non-zero element, and there is one zero left after zero compensation. Therefore, the new representative vectors are expanding and adding unit vectors: [0,2,0],[1,1,0], as well as adding unit vectors without expanding: [2,0].

B.4.4 Example 2

Update for s=2 with representative vector set {[0,0,2],[0,1,1],[1,0,1],[0,2,0], [1,1,0],[2,0]}. According to the above description, representative vectors for s=3 are obtained as

[0,0,2]→[0,0,0,3],[0,0,1,2],[0,1,0,2],[1,0,0,2]
[0,1,1]→[0,0,2,1],[0,1,1,1],[1,0,1,1]
[1,0,1]→[0,2,0,1],[1,1,0,1],[2,0,1]
[0,2,0]→[0,0,3,0],[0,1,2,0],[1,0,2,0],[0,3,0],[1,2,0]
[1,1,0]→[0,2,1,0],[1,1,1,0],[2,1,0]
[2,0]→[3,0]

For [0,1,0,2] with [[0,1,1,1]] as its zero compensated representative vector there is no zero on the right hand of its first non-zero element after zero compensation, while for [1,0,0,2] with [[1,0,1,1]] as its zero compensated representative vector there is one zero left on the right hand side of its first non-zero element even after zero compensation. Accordingly, different updating procedures will be performed for [0,1,0,2] and [1,0,0,2] to get representative vectors for s=4.

Figure 4:
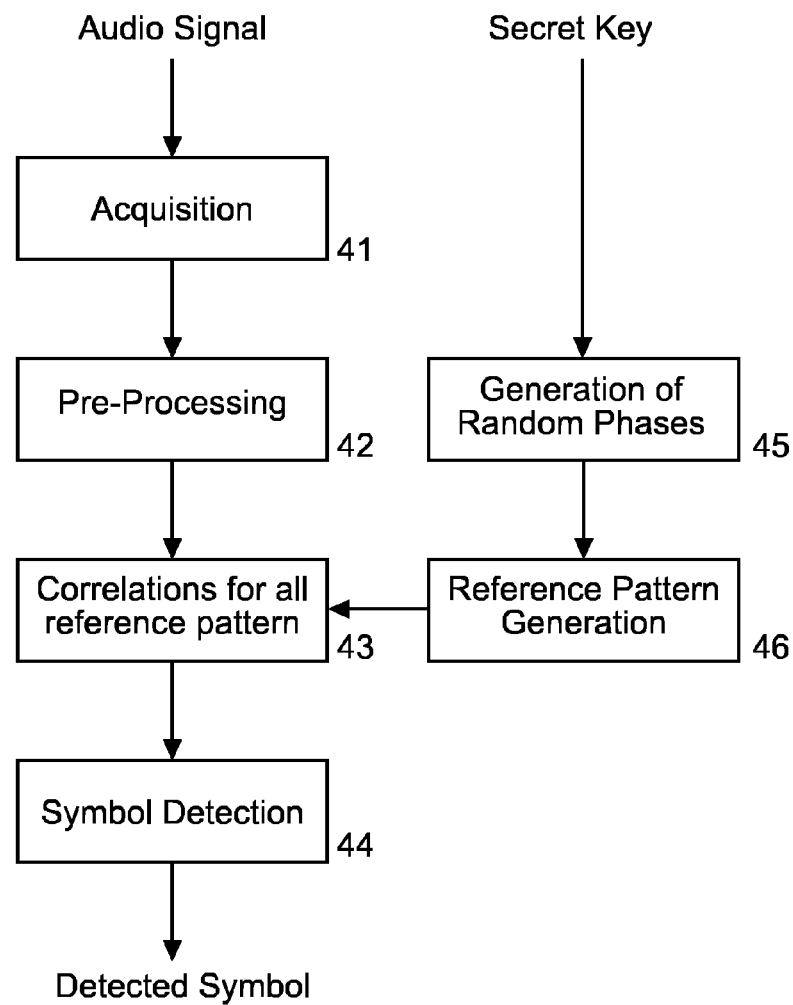
FIG. 4 Block diagram for the inventive processing.

In the block diagram of the inventive watermark decoder in FIG. 4, a received audio signal is sampled in an acquisition or receiving section step or stage 41, and thereafter passes through a pre-processing step or stage 42 (which can carry out e.g. a spectral whitening) to a correlation step or stage 43, in which a current section of the received audio signal is correlated with at least two different candidate reference pattern signals is from a reference pattern signal generation step or stage 46 and related to corresponding different watermark symbols, so as to produce in each case N current correlation result values $c_{is}$ for each candidate watermark symbol is. There is a total number nSymbols of different candidate reference pattern signals is, for instance, nSymbols=2. A secret key is used to generate corresponding pseudo-random phase signals in a random phase generation step or stage 45, which pseudo-random phase signals control the reference pattern signal generation in step/stage 46. In a watermark symbol detection step or stage 44 following the correlation in step/stage 43, windows of length L are checked around the M main correlation result peaks of the current N correlation result values $c_{is}$ and a processing as described above and in connection with FIG. 5 is carried out, in order to determine and output the corresponding detected watermark symbol.

Figure 5:
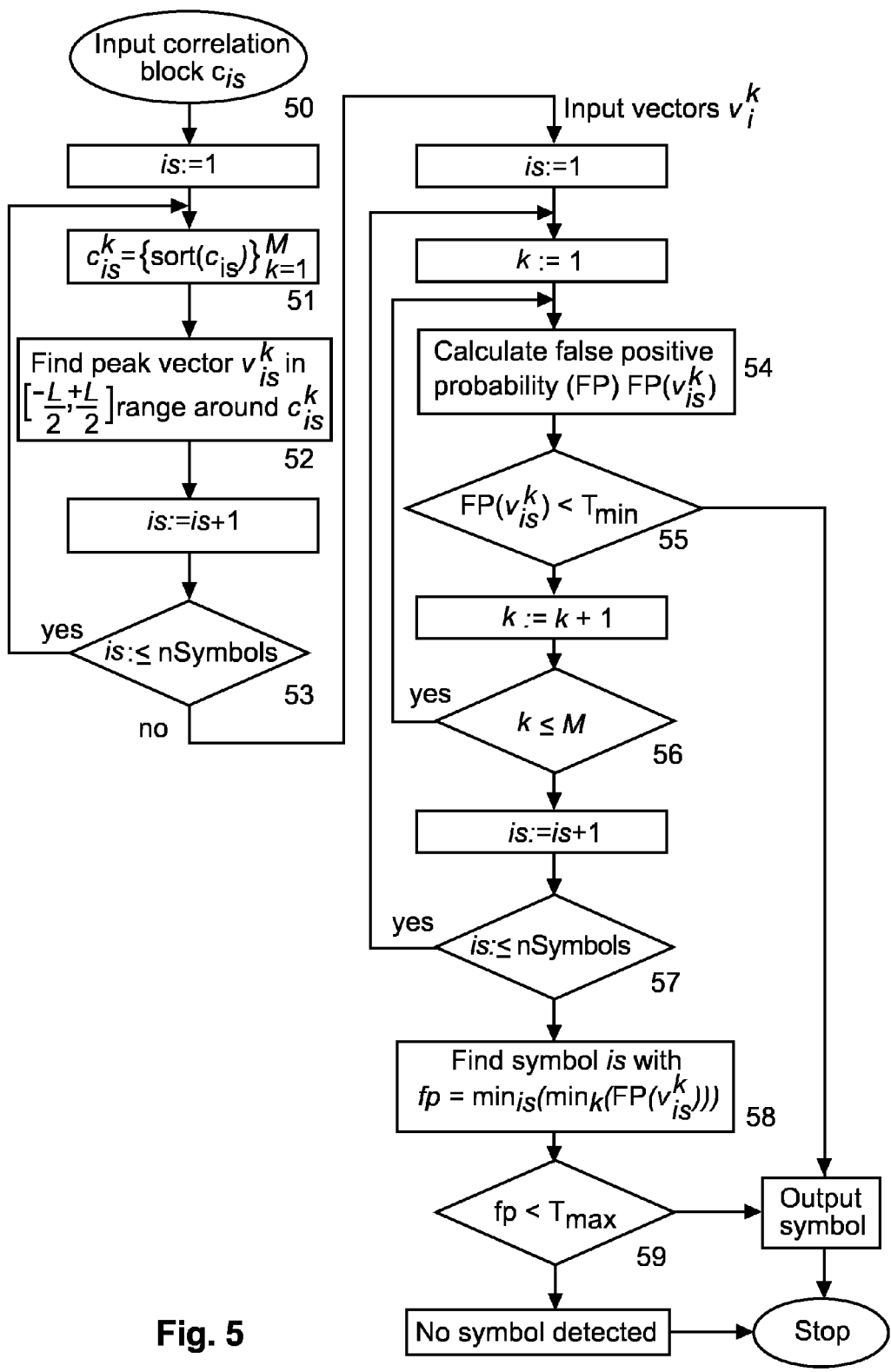
FIG. 5 Flow diagram for the inventive processing.

In the flow diagram of FIG. 5, for an input correlation block $c_{is}$ received with step 50 the parameter is is set to '1'. For example, is=1 corresponds to candidate watermark symbol '0' and is=2 corresponds to candidate watermark symbol '1'. For each candidate watermark symbol is, a set $c_{is}$ of corresponding correlation result values is sorted in step 51 according to their magnitude, such that the M biggest amount values $c_{is}^k$ (i.e. global peak amount values) are determined, e.g. M=3 and k=1, 2, 3. In step 52, for each global peak amount value k=1, ..., M and for the current candidate watermark symbol is, a corresponding vector $v_{is}^k$ of $n_p$ peak amount values within a ±L/2 range (i.e. in a window of length L) of original correlation result values around each global peak (i.e. including each global peak) is determined. Controlled by comparison step 53, parameter is runs in a corresponding loop from '1' to 'nSymbols'.

Because L is significantly smaller than N, the summed-up length of all length-L windows is smaller than length N. In practise, L<<N such that L is at least one order of magnitude smaller than N, i.e. N/L>10. For example, N=16 k and L=1 k.

Thereafter, an outer loop running from is=1 to nSymbols and an inner loop running from k=1 to M are entered, controlled by comparison steps 57 and 56, respectively. In the inner loop, the false positive probability $FP(v_{is}^k)$ is computed in step 54 from the current correlation result values, followed by a comparison step 55, 1 an increment of k, a comparison step 56, and in the outer loop an increment of is and a comparison step 57. The false positive probability $FP(v_{is}^k)$ value corresponds to the probability that for one or more times such length-L window contains $n_p$ or more correlation result amount values greater than or equal to $n_p$ peak values in an average or expected probability distribution for correlation result amount values for a non-watermarked audio signal. Following comparison step 57 the candidate watermark symbol is is determined in step 58 for which the final false positive probability fp is $\min_{is}(\min_k(FP(v_{is}^k)))$. Step 59 checks by comparing that fp value with a further threshold $T_{max}$ whether or not a watermark symbol has been detected. If true, that detected watermark symbol is output. If not true, no watermark symbol has been detected.

In comparison step 55, if $FP(v_{is}^k)$ is smaller than a predetermined threshold $T_{min}$, it is assumed that the correct candidate watermark symbol is has been found, both loops are left in order to save computation time, and that watermark symbol is output.

Figure 6:
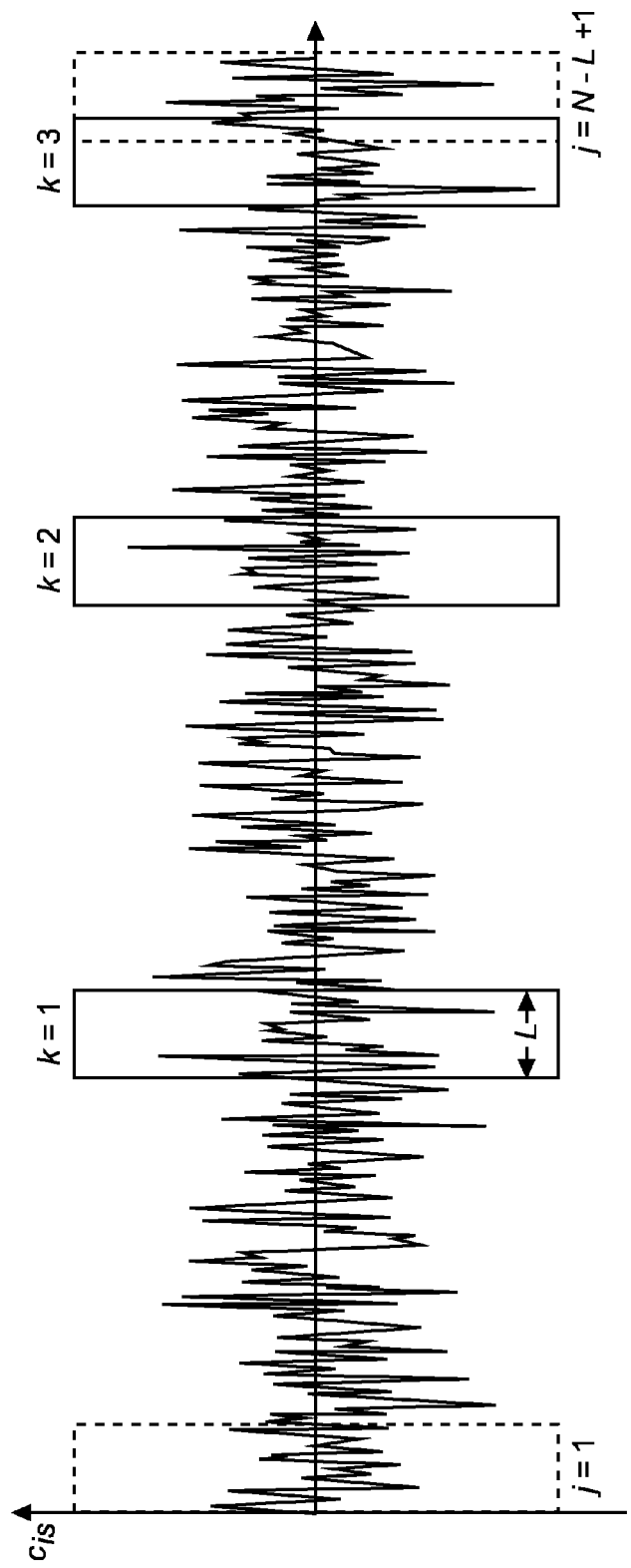
FIG. 6 Example correlation result with three length-L windows depicted.

FIG. 6 shows an example correlation result of length N and three length-L windows with k=1, 2, 3 depicted. Each length-L window is arranged around peaks in the N correlation result values. The first possible length-L window position within N is j=1 and the last possible length-L window position is j=N−L+1.

The inventive processing can be carried out by a single processor or electronic circuit, or by several processors or electronic circuits operating in parallel and/or operating on different parts of the inventive processing.

The invention claimed is:

1. A method for determining watermark symbols in a received audio signal that contain echoes, reverberation and/or noise, said method comprising:
   correlating a section of the received audio signal with at least two different candidate reference pattern signals related to corresponding different candidate watermark symbols is, so as to produce in each case N correlation result values $c_{is}$ for each candidate watermark symbol is;
   for each candidate watermark symbol is, determining M peak values within said correlation result values $c_{is}$,
   for each one of said M peak values denoted global peak values and for each candidate watermark symbol is, determining from the correlation result values $c_{is}$ a corresponding vector $v_{is}^k$ of $n_p$ peak values within each one of M windows of length L, each length-L window including one of said M global peak values and the summed-up length of all length-L windows being smaller than N, wherein k=1, . . . , M;
   for each one of said M windows of length L, calculating a false positive probability value $FP(v_{is}^k)$ based on the vector $v_{is}^k$ of peak values and an average or expected probability distribution for correlation result values for a non-watermarked audio signal, wherein the false positive probability $FP(v_{is}^k)$ is defined as the probability that for one or more times such a length-L window contains $n_p$ or more correlation result absolute values greater than or equal to the $n_p$ peak values in an average or expected probability distribution for correlation values for a non-watermarked audio signal; and
   selecting or the section of said received audio signal that candidate watermark symbol is as a detected watermark symbol which has the minimum false positive probability value $\min_{is}(\min_k(FP(v_{is}^k)))$ if said minimum false positive probability value $\min_{is}(\min_k(FP(v_{is}^k)))$ is smaller than a predetermined threshold, wherein otherwise it is decided that no watermark symbol has been detected.

2. The method according to claim 1 wherein, if in said calculation of said false positive probability $FP(v_{is}^k)$ value that value is smaller than a further predetermined threshold, it is assumed that a correct candidate watermark symbol is has been found and the further processing is omitted, and wherein said predetermined threshold is greater than said further predetermined threshold.

3. The method according to claim 1, wherein M=3.

4. The method according to claim 1, wherein there are two different candidate watermark symbols.

5. An apparatus for determining watermark symbols in a received audio signal that can contain echoes, reverberation and/or noise, said apparatus comprising a processor configured to:
   correlate a section of the received audio signal with at least two different candidate reference pattern signals related to corresponding different candidate watermark symbols is, so as to produce in each case N correlation result values $c_{is}$ for each candidate watermark symbol is;
   determine, for each candidate watermark symbol is, M peak values within said correlation result values $c_{is}$, and determine, derived from said M correlation result peak values for each candidate watermark symbol is, for said section of said received audio signal a watermark symbol out of said candidate watermark symbols is,
   wherein, for each one of said M peak values denoted global peak values and for each candidate watermark symbol is, there is determined from the correlation result values $c_{is}$ a corresponding vector $v_{is}^k$ of $n_p$ peak values within each one of M windows of length L, each length-L window including one of said M global peak values and the summed-up length of all length-L windows being smaller than N, wherein k=1, . . . , M, and wherein, for each one of said M windows of length L, a false positive probability value $FP(v_{is}^k)$ is calculated based on the vector $v_{is}^k$ of peak values and an average or expected probability distribution for correlation result values for a non-watermarked audio signal, wherein the false positive probability $FP(v_{is}^k)$ is defined as the probability that for one or more times such a length-L window contains $n_p$ or more correlation result absolute values greater than or equal to the $n_p$ peak values in an average or expected probability distribution for correlation values for a non-watermarked audio signal, and wherein for the section of said received audio signal that candidate watermark symbol is is selected as a detected watermark symbol which has the minimum false positive probability value $\min_{is}(\min_k(FP(v_{is}^k)))$ if said minimum false positive probability value $\min_{is}(\min_k(FP(v_{is}^k)))$ is smaller than a predetermined threshold, and wherein otherwise said processor decides that no watermark symbol has been detected.

6. The apparatus according to claim 5 wherein, if in said calculation of said false positive probability $FP(v_{is}^{k})$ value that value is smaller than a further predetermined threshold, it is assumed that a correct candidate watermark symbol is has been found and the further processing is omitted, and wherein said predetermined threshold is greater than said further predetermined threshold.

7. The apparatus according to claim 5, wherein M=3.

8. The apparatus according to claim 5, wherein there are two different candidate watermark symbols.

* * * * *